Sept. 13, 1932.   F. P. GROOM   1,876,919
PISTON RING
Filed Sept. 23, 1931
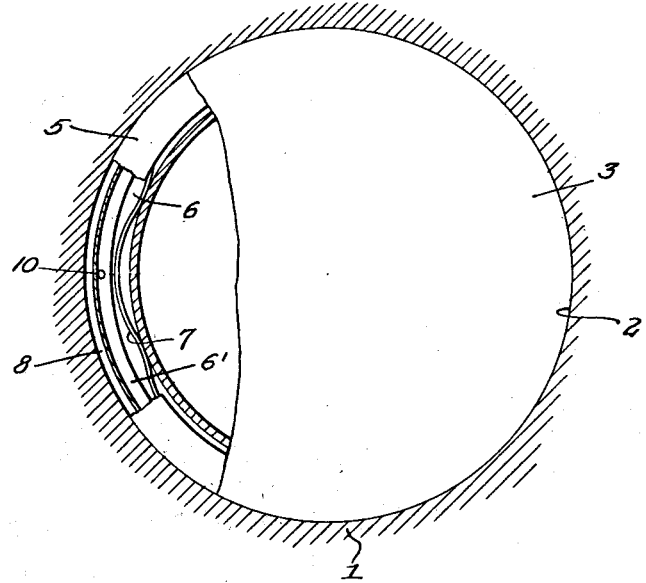
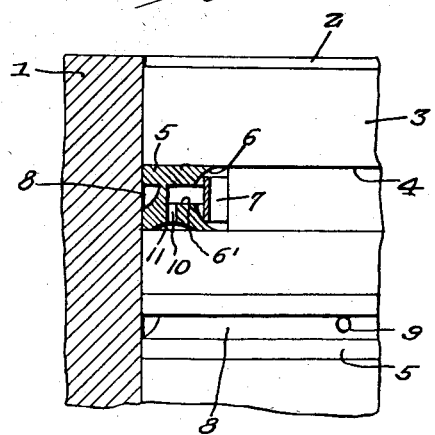
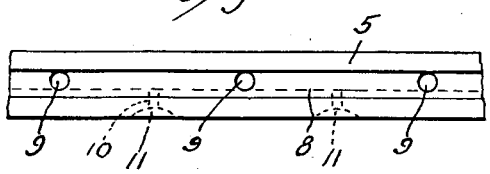
Inventor
Frederick P. Groom,
By Clarence A. O'Brien
Attorney Patented Sept. 13, 1932

1,876,919

UNITED STATES PATENT OFFICE

FREDERICK P. GROOM, OF MUSKEGON, MICHIGAN

PISTON RING

Application filed September 23, 1931. Serial No. 564,679.

The present invention relates to piston rings, and has for its primary object to provide in a manner as hereinafter set forth, a device of this character, embodying a novel construction, combination and arrangement of parts, whereby what is commonly known as "pumping" oil past the pistons of an engine into the combustion chamber will be substantially prevented, thereby materially reducing the formation of carbon in the combustion chambers.

Another important object of the invention is to provide a piston ring of the aforementioned character embodying a novel construction through the medium of which the walls of the ring grooves in the piston will be properly lubricated to permit the ring to function properly therein, at all times.

Other objects of the invention are to provide a piston ring of the character described which will be simple in construction, strong, durable, efficient and reliable in use, and which may be manufactured at low cost.

All of the foregoing and still further objects and advantages of the invention will become apparent from a study of the following specification, taken in connection with the accompanying drawing, wherein like characters of reference designate corresponding parts thruout the several views, and wherein:—

Figure 1 is a view in top plan of a piston equipped with rings, in accordance with the present invention, said piston being broken away to disclose a portion of the upper ring, said upper ring being broken away in section.

Fig. 2 is a cross sectional view thru a portion of the ring.

Fig. 3 is a view in vertical cross section through a portion of an engine block showing a portion of a piston in a cylinder of said block and further showing, in cross section, a ring in accordance with the present invention and in elevation, also a portion of a ring in accordance with this invention.

Fig. 4 is a view in elevation of a portion of a ring in accordance with the present invention.

Referring now to the drawing in detail, it will be seen that the reference numeral 1 designates a portion of an engine block having therein a cylinder 2. A piston 3 is mounted for reciprocation in the cylinder 2 as usual, said piston being provided with the circumferentially extending ring receiving grooves 4, any suitable number of which may be provided.

The ring constituting the present invention is designated by the reference numeral 5. The inner periphery of the ring is provided with an arcuate groove 6 extending from the upper side to the lower side of the ring. The reference numeral 7 designates an expander which is mounted in the groove 4 of the piston 3 and which is engageable with the ring in the groove 6 for yieldingly urging the ring outwardly into engagement with the cylinder wall. The ring is further provided with a groove 6' of uniform width throughout which communicates with the arcuate groove. It may be well to here state that the ring is split and formed from resilient metal.

The outer periphery of the ring is provided with a circumferentially extending groove 8, the upper wall of which is flat and disposed at right angles to the axis of the ring. From the flat upper wall thereof the groove 8 curves downwardly and outwardly to the outer periphery of the ring 6. Transverse oil passages 9 extend from the groove 8 to the groove 6', said passages being at right angles to the axis of the ring.

Concavities or wells 11 are provided in the lower side of the ring and ports 10 extend between said concavities or wells and the groove 6'. The ports 10 provide means for drain oil from the grooves and are substantially staggered relative to the passages 9 to preserve the strength of the ring.

On the upstroke of the piston, the formation of the groove 8 is such that the ring 5 will ride over the film of oil on the cylinder wall. On the down stroke of the piston, the film of oil will be scraped from the cylinder wall by the right angularly disposed upper wall of the groove 8. This oil will pass through the passages 9 toward the rear or into the grooves 6, and 6'. From the groove 6' the oil may gravitate through the ports 10 to the wells 11 in the lower side of the ring.

It is believed that the many advantages of a piston ring in accordance with the present invention will be readily understood, and although the preferred embodiment of the invention is as illustrated and described, it is to be understood that changes in the details of construction, and in the combination and arrangemet of parts, may be resorted to which will fall within the scope of the invention as claimed.

Having thus described my invention, what I claim as new is:—

1. A piston ring having a circumferentially extending groove in its inner periphery and further having a circumferentially extending groove in its outer periphery, said ring still further having a series of circumferentially spaced apertures extending transversely therethrough, at right angles to the axis thereof from the second named groove to the first named groove, said ring still further having ports extending from the first-named groove to the lower side of the ring.

2. A piston ring having an arcuate groove in its inner periphery extending substantially from its upper side to its lower side, the ring further having a circumferential groove of substantially uniform width extending outwardly from the arcuate groove, said ring still further having a circumferential groove in its outer periphery including a substantially flat upper wall extending substantially at right angles to the longitudinal axis of the ring and an arcuate wall extending from the upper wall downwardly and outwardly to the outer periphery of the ring, said ring further having passages extending transversely therethrough between the second and third named grooves, the ring further having concavities at spaced points in its lower side, and still further having ports extending between the concavities and the second-named groove, the ports communicating with the second-named groove at points intermediate the passages.

In testimony whereof I affix my signature.

FREDERICK P. GROOM.